United States Patent [19]

Stein et al.

[11] Patent Number: 5,092,757
[45] Date of Patent: Mar. 3, 1992

[54] APPARATUS FOR FLIPPING AND ALIGNING A DOUGH SHEET

[75] Inventors: Steven A. Stein, Buffalo; William C. Bornhorst, Plymouth; Michael P. Waldherr, Bloomington, all of Minn.

[73] Assignee: General Mills, Inc., Minneapolis, Minn.

[21] Appl. No.: 699,039

[22] Filed: May 13, 1991

[51] Int. Cl.$^5$ .............................. A21C 3/02
[52] U.S. Cl. ................... 425/363; 99/450.1; 425/135; 425/383
[58] Field of Search ............. 425/135, 363, 383; 99/450.1, 443 R, 426, 432, 382

[56] References Cited

U.S. PATENT DOCUMENTS

| 2,145,550 | 1/1939 | Loose | 425/383 |
| 3,690,248 | 9/1972 | Shafer | 99/450.1 |
| 4,036,569 | 7/1977 | Oshiri | 425/135 |
| 4,047,978 | 9/1977 | Trostman et al. | 99/450.1 |
| 4,431,396 | 2/1984 | Lee | 99/450.1 |
| 4,438,145 | 3/1984 | Baker | 99/450.1 |
| 4,557,684 | 12/1985 | Romine et al. | 425/383 |
| 4,858,524 | 8/1989 | Simelunas et al. | 99/450.1 |
| 4,946,430 | 8/1990 | Kohmann | 425/383 |

Primary Examiner—Willard E. Hoag
Attorney, Agent, or Firm—John A. O'Toole

[57] ABSTRACT

A single continuous dough sheet is conveyed by a conveyor up an incline to a dough tension and drive system. In the system, the dough sheet passes around a lower drive roller, around an intermediate drive roller, and around an upper drive roller. The dough sheet extends at a downward angle to an idler roller which directs the dough sheet generally vertically downward in a flat condition. A wishbone pushing element having a rounded V-shape forms the first face of the dough sheet into a generally V-shape having two wings. The wings of the V-shape are then guided by an aligning element such as laterally spaced rollers which roll on the opposite face of the wings to form a folded, two-ply continuous dough sheet. The angular relationship of the legs of the pushing element, the lateral spacing of the rollers of the aligning element and the three dimensional positioning of the pushing element and the aligning element can be adjusted to insure that the free edges in the folded continuous dough sheet are aligned relative to each other.

11 Claims, 5 Drawing Sheets

APPARATUS FOR FLIPPING AND ALIGNING A DOUGH SHEET

BACKGROUND

The present invention generally relates to apparatus and methods for flipping and aligning a flexible, continuous sheet, particularly to food processing apparatus and methods for flipping and aligning a dough sheet into a folded, two-ply continuous sheet, and more particularly to apparatus and methods for flipping and aligning a dough sheet for the preparation of a snack product by conventional deep fat frying.

One type of snack product which has gained wide market acceptance is the "puffed" snack piece. In certain methods of preparation, a cooked farinaceous dough is formed into a single continuous dough sheet. This dough sheet is then run through a piece forming apparatus which includes an opposed pair of rollers at least one of which has depressions which stamp out the desired shape and size pieces from the dough sheet. After formation of the dough pieces, the pieces are dried under controlled conditions from a moisture content of about 18% down to a moisture content of between 12% and 14% to form a pellet called a half product piece. The moisture content of the half product piece is sufficiently low to exhibit extended shelf stability. The snack product is prepared from the half product piece by conventional deep fat frying. The frying of the half product piece generates steam volumes inside of the half product piece to puff the half product piece resulting in a light, puffed snack piece having surface corrugations.

The sale of snack food products is a highly competitive business. The novelty of snack food products decline rapidly, as new and different types of snack foods are introduced to maintain or increase market share. Puffed snack pieces can be varied in various ways such as by changing the shapes, sizes, and surface corrugations of the pieces or by changing the composition of the dough from which the half product pieces are prepared. Another variation is to have the puffed snack piece of a hollow structure, with the hollow configuration resulting from the fabrication of the half product pieces from a two-layer laminated dough sheet.

One method of forming a laminated dough sheet is to fold a single continuous dough sheet into a two-plied dough sheet. However, the formation of such a two-plied dough sheet continuously from a single dough sheet presents many problems. In particular, even though the free edges of the folded sheet are initially aligned, the free edges will tend to travel relative to each other upon continued operation of a folding device. This problem is particularly severe as the speed of operation of the machinery increases. The failure to provide an evenly folded two-ply dough sheet results in improper feeding into the dough piece former. At the one, misaligned free edge, defective half product pieces are formed. At the other end, an excess of dough material is fed to the piece former resulting in either generation of scrap material, deformation of formed pieces, or both.

Accordingly, it is an object of the present invention to provide novel apparatus and methods for the continuous creation of a two-plied sheet from a single sheet.

Another object of the present invention is to provide novel apparatus and methods for folding a dough sheet and aligning the folded sheet into a two-plied sheet.

Yet another object of the present invention is to provide novel apparatus and methods for continuously fabricating a two-plied dough sheet from a single dough sheet. In this regard, the free edges of the folded sheet are aligned even with continuous and high speed operation.

SUMMARY

Surprisingly, the above objectives can be satisfied in the field of puffed snack piece fabrication by providing, in the preferred form, apparatus and methods of flipping and aligning a single continuous dough sheet where the single continuous dough sheet is directed vertically downward in a flat condition, shaped into a V-shape by pushing the first face of the single continuous dough sheet intermediate the free edges of the single continuous dough sheet, and then guiding and aligning the wings of the V-shape to form the folded continuous dough sheet, with the free edges being aligned relative to each other in the folded continuous dough sheet.

The present invention will become clearer in light of the following detailed description of an illustrative embodiment of this invention described in connection with the drawings.

Figure 1:
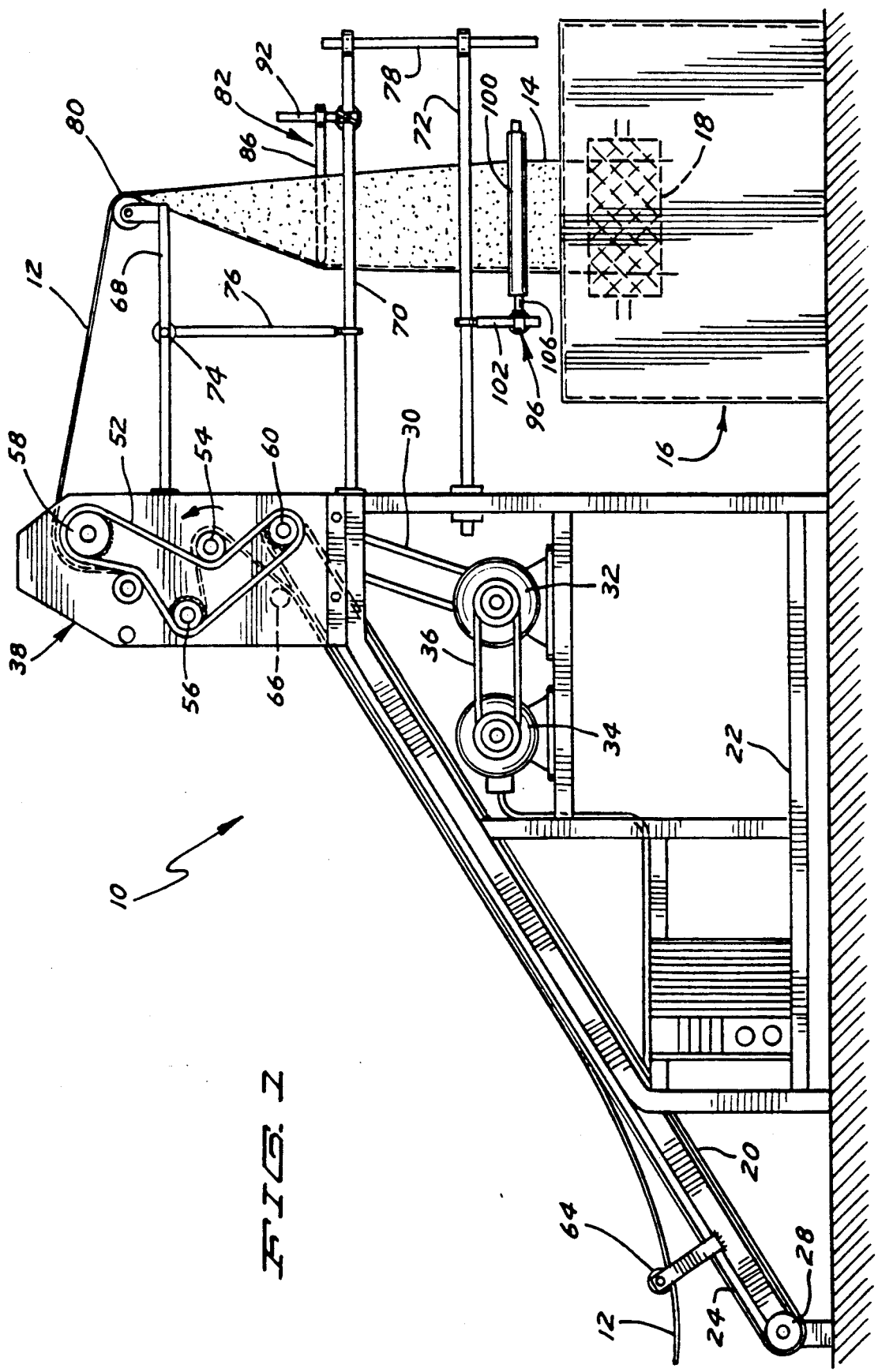
FIG. 1 shows a front plan view of an apparatus for flipping and aligning a single continuous dough sheet into a folded continuous dough sheet according to the preferred teachings of the present invention.

All figures are drawn for ease of explanation of the basic teachings of the present invention only; the extensions of the Figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "first", "second", "lower", "upper", "end", "face", "edge", and similar terms are used herein, it should be understood that these terms have reference only to the structure shown in the drawings as it would appear to a person viewing the drawings and are utilized only to facilitate describing the invention.

DESCRIPTION

Referring now to the drawings and in particular to FIG. 1, an apparatus utilizing the present methods for flipping and aligning a dough sheet according to the preferred teachings of the present invention is shown and generally designated 10. Particularly, apparatus 10 folds a single continuous dough sheet 12 formed of a cooked farinaceous dough into a folded, continuous two-ply dough sheet 14. Dough sheet 12 has first and second opposed major faces and two opposed free edges. Folded dough sheet 14 has outside faces reduced about one-half in area and which are spaced generally twice the thickness of dough sheet 12. Folded continuous dough sheet 14 can be provided by apparatus 10 to a piece forming apparatus 16 conveniently constructed having opposed pair of rollers 18 having cavities or depressions which stamp out the desired shape and size pieces from folded continuous dough sheet 14.

Still referring to FIG. 1, it can be seen that apparatus 10 generally further includes a conveyor 20 held at an incline in the order of 30° by frame 22. Conveyor 20 generally includes a continuous rubber mat 24 or the like entrained around a drive roller 26 and an idler roller 28. Drive roller 26 is driven by any suitable means such as a V-belt 30 driven by a clutch 32 in turn driven by an electric motor 34 through V-belt 36 as shown.

Figure 2:
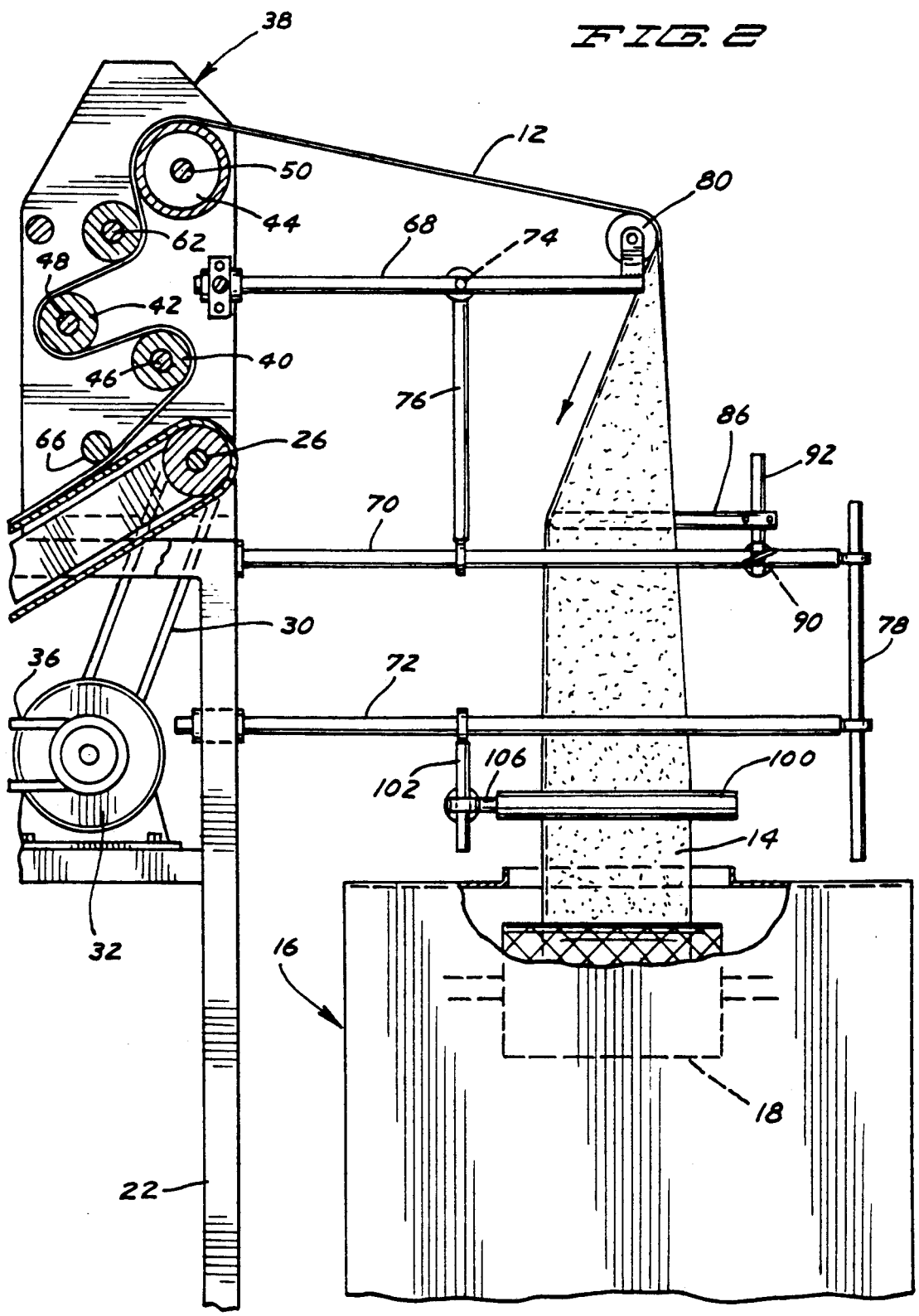
FIG. 2 shows a partial, front plan view of the apparatus of FIG. 1, with portions being broken away.

Referring now to both FIGS. 1 and 2, it is seen that apparatus 10 further includes a dough tension and drive system 38 including lower, intermediate, and upper drive rollers 40, 42, and 44 which are rotatably mounted about axle shafts 46, 48, and 50, respectively. Rollers 40, 42, and 44 are driven in a synchronized manner by suitable means such as a continuous, toothed belt 52 extending around pulleys 54, 56, and 58 secured to shafts 46, 48, and 50, respectively, and around pulley 60 secured to and rotatable with drive roller 26 as shown. In FIG. 2, it can be seen that the single continuous dough sheet 12 extends from conveyor 20 around the periphery of roller 40, to and around the periphery of roller 42, and to and around the periphery of roller 44. An idler roller 62 may be provided to push against single continuous dough sheet 12 intermediate rollers 42 and 44 to increase the wrap angle and contact of dough sheet 12 with roller 44. Tension rollers 64 and 66 may be provided to hold dough sheet 12 upon mat 24 of conveyor 20.

Figure 3:
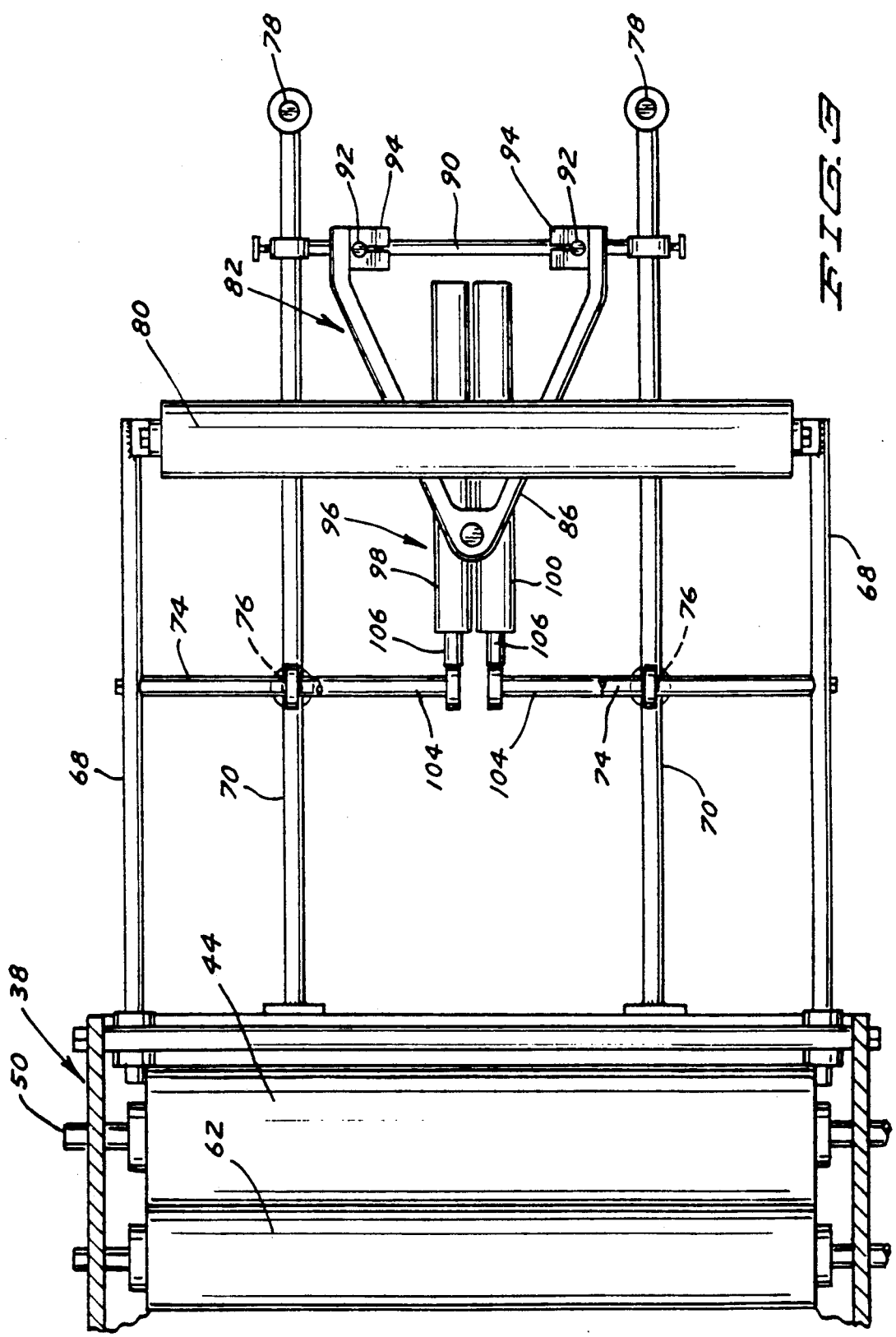
FIG. 3 shows a partial, top plan view of the apparatus of FIG. 1.
Figure 4:
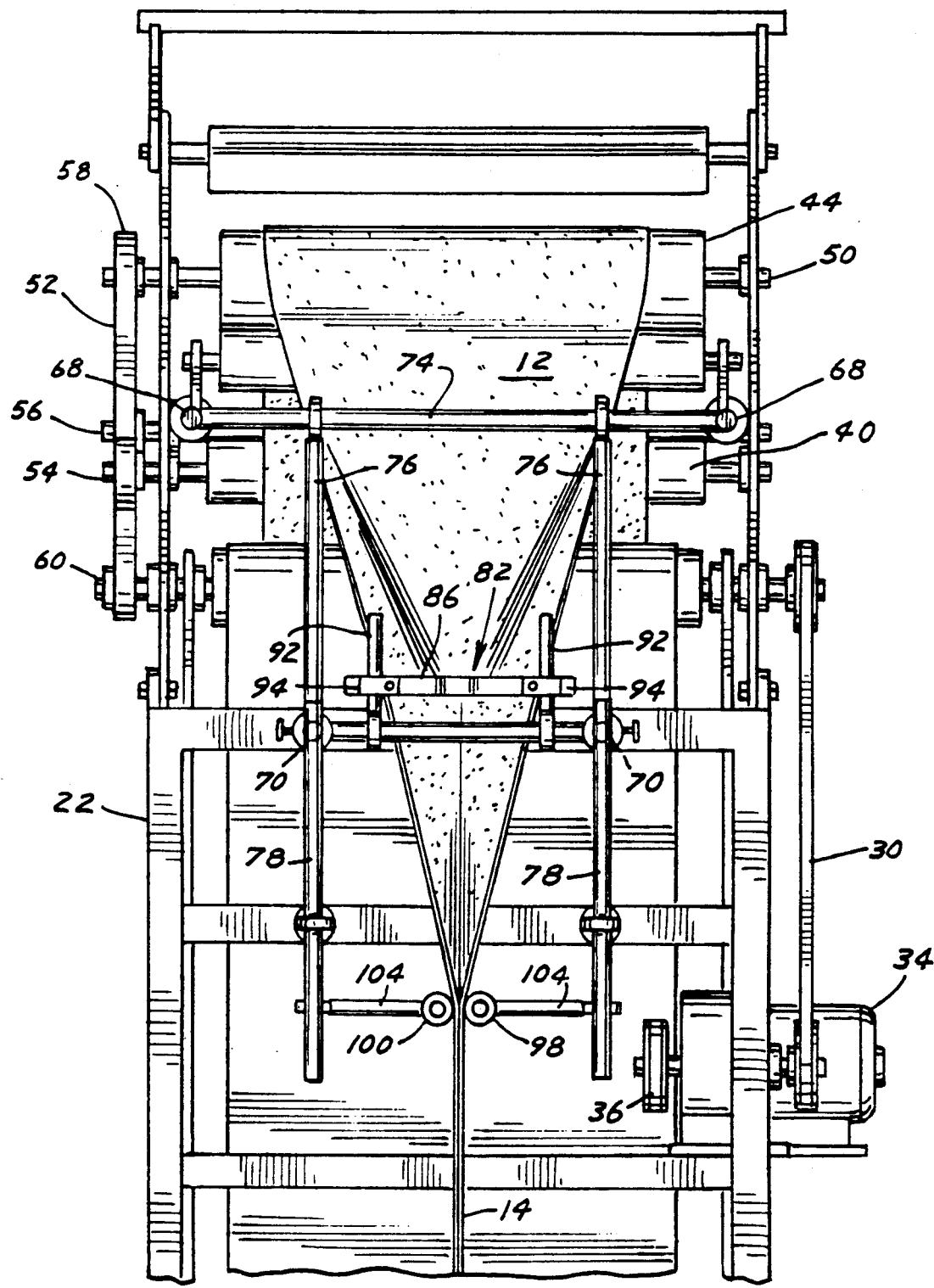
FIG. 4 shows an end elevation of the apparatus of FIG. 1.

Now referring briefly to FIG. 3, it is seen that frame 22 of apparatus 10 includes first, second, and third pairs of horizontal arms 68, 70, and 72 which in the preferred form extend in a cantilever manner. In the most preferred form and as best seen in FIG. 4, the spacing between arms 70 and between arms 72 is equal but less than the spacing between arms 68. Frame 22 can further include a transverse horizontal brace 74 extending between arms 68. Now referring back to FIG. 2, it is seen that frame 22 can further include spaced, first and second vertical braces 76 each of which extend between brace 74 and arms 70. Frame 22 further includes spaced, third and fourth braces 78 adjustably extending between the respective free ends of arms 70 and of arms 72. In the most preferred embodiment, the arms and braces of the cantilevered frame section are tubular so as to facilitate adjustment by the use of adjustable clamps. Further, the cantilever mounting allows for ease of removal when necessary to perform maintenance on piece forming apparatus 16.

In FIG. 2, it is seen that apparatus 10 further includes a dough idler roller 80 rotatably mounted to and between the free ends of arms 68. The vertical height of roller 80 is less than the vertical height of drive roller 44 of system 38. Thus, sheet 12 has a larger angle of wrap and more contact with drive roller 44 allowing better driving of sheet 12 by system 38.

Figure 5:
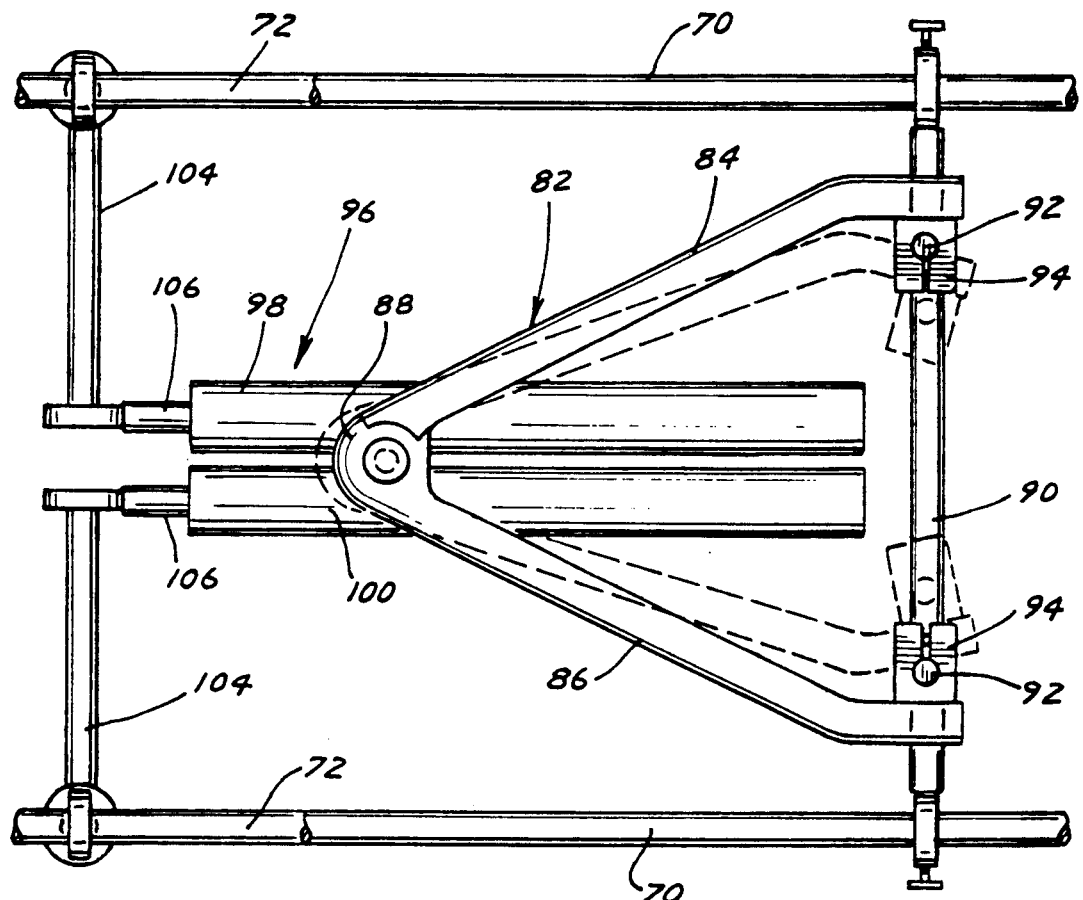
FIG. 5 shows a partial, cross-sectional view of the apparatus of FIG. 1.
Figure 6:
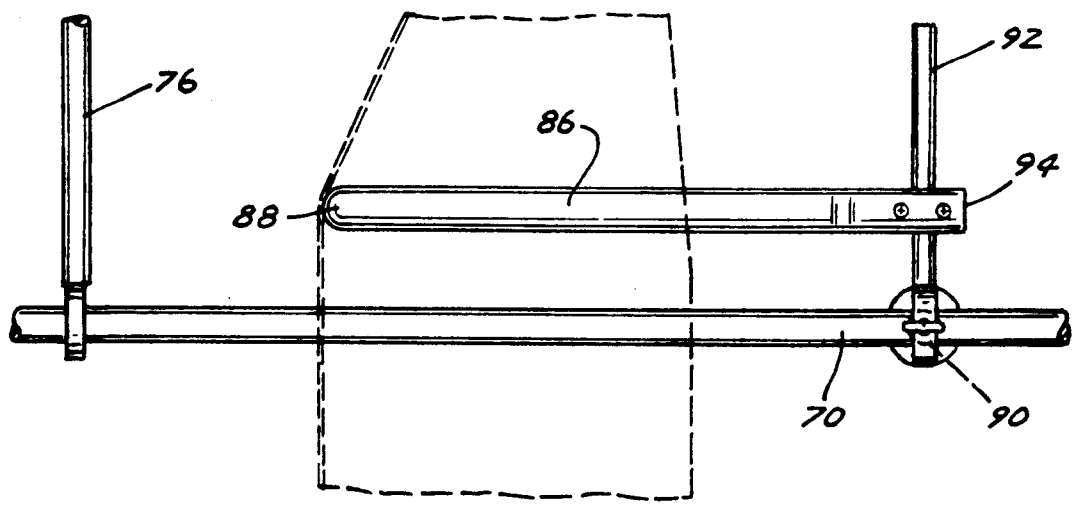
FIG. 6 shows an enlarged, partial, front view of the apparatus of FIG. 1.

Now referring in particular to FIG. 5 and also to FIG. 6, it is seen that apparatus 10 further includes an adjustable, V-shaped, wishbone pushing element 82 adjustably secured to and between and immediately above arms 70. Specifically, wishbone pushing element 82 includes first and second legs 84 and 86 having their first ends connected by an adjustable, rounded joint 88. Joint 88 allows the angular relationship between legs 84 and 86 to be variably adjusted and provides a smooth outer transition between legs 84 and 86 in all angular relationships of legs 84 and 86. For adjustably mounting wishbone pushing element 82, frame 22 is provided with horizontal, transverse brace 90 having its opposite ends adjustably slideable on arms 70 such that brace 90 can be adjustably positioned longitudinally relative to arms 70. Frame 22 further includes first and second upright shafts 92 having their lower ends adjustably slideable on brace 90 such that the lateral spacing between and the lateral positioning of shafts 92 can be adjusted by sliding shafts 92 on brace 90 as illustrated by adjusted positions of the legs shown in relief. The second, free ends of legs 84 and 86 are adjustably secured to shafts 92 such as by clamps 94 such that the second, free ends of legs 84 and 86 may be vertically adjusted relative to shafts 92 and thus to brace 90 and arms 70. It can then be appreciated that the angular relationship between legs 84 and 86 of wishbone pushing element 82 and the three dimensional positioning of wishbone pushing element 82 (vertical, transverse and longitudinal) can each be independently adjusted by adjustment of brace 90 relative to arms 70, shafts 92 relative to each other and to brace 90, and clamps 94 relative to each other and to shafts 92. As best seen in FIG. 3, the first ends of legs 84 and 86 and joint 88 are located forward of dough idler roller 80 while the second, free ends of legs 84 and 86 are located rearward of dough idler roller 80.

Now referring again to FIG. 5, it is seen that apparatus 10 further includes an adjustable aligning element 96 shown in its most preferred form as comprising first and second guiding rollers 98 and 100. The construction of frame 22 as described immediately below importantly enables adjustment of the position of aligning element 96 longitudinally, transversely, and vertically, as well as enabling the adjustment of the lateral spacing or gap between guiding rollers 98 and 100 themselves. Now referring back briefly to FIG. 2, it is seen that frame 22 includes first and second vertical shafts 102 extending downward from and having their upper ends adjustably slideable on arms 72. Thus, shafts 102 can be adjustably positioned longitudinally relative to arms 72 and each other for adjustably mounting element 96. Frame 22 further includes first and second, horizontal posts 104 having their outer ends adjustably slideable on shafts 102 such that the vertical spacing between posts 104 and between posts 104 and arms 72 can be adjusted by sliding posts 104 up or down on shafts 102.

Now referring to FIG. 5, it can be seen that rollers 98 and 100 each are fabricated with axle shafts 106 which shafts 106 are slideably mounted on posts 104 such that the lateral spacing between and the lateral positioning of rollers 98 and 100 can be adjusted by sliding shafts 106 on posts 104. It can then be appreciated that the spacing between rollers 98 and 100 and the three dimensional positioning of aligning element 96 can be adjusted by adjustment of shafts 102 relative to each other and to arms 72, posts 104 relative to each other and to shafts 102, and shafts 106 relative to each other and to posts 104.

OPERATION OF THE INVENTION

Now that the basic construction of apparatus 10 according to the preferred teachings of the present invention has been explained, the operation of apparatus 10 can be set forth and appreciated. Referring first to FIG. 2, dough sheet 12 extends from conveyor 20 and through system 38 to roller 80 at a downward angle. Dough sheet 12 extends around roller 80, with roller 80 directing dough sheet 12 generally vertically downward in a flat condition. Pushing element 82 pushes the first face of dough sheet 12 forward intermediate the first and second free edges of dough sheet 12 and allowing the sides of dough sheet 12 to extend rearwardly therefrom along legs 84 and 86 of wishbone pushing element 82. Now in FIGS. 1, 2 and 4, it can be seen that dough sheet 12 has an intermediate V-shape corresponding to wishbone pushing element 82 proximate thereto and includes at this position a first wing and a second wing interconnected by an intermediate portion. Now in FIG. 4, it can be seen that the V-shaped dough sheet 12 extends vertically downward from pushing element 82 into and through aligning element 96. In aligning element 96, the first face of the wings of dough sheet 12 are pushed into an abutting relation by passing the second, opposite face of the wings of dough sheet 12 between guiding rollers 98 and 100, forming folded continuous dough sheet 14. The first and second free edges are aligned relative to each other in folded dough sheet 14. Folded dough sheet 14 extends vertically downward from aligning element 96 (see FIG. 2) into piece forming apparatus 16 and particularly rollers 18 thereof.

It should then be noted that apparatus 10 relies upon the weight of sheets 12 and 14 and any pulling force of piece forming apparatus 16 to pull sheet 12 through apparatus 10 with the momentum provided by conveyor 20 and system 38. Specifically as seen in FIG. 2, dough sheet 12 extends vertically downward from roller 80 such that dough sheet 12 is pulled by gravity downward, with roller 80 changing the direction of the gravitational forces on dough sheet 12 toward system 38. Due to the lesser vertical height of roller 80 than roller 44 of system 38, dough sheet 12 extends at an downward angle from roller 44 to roller 80. This downward angle increases the wrap around roller 44 and complements the gravitational forces on dough sheet 12 acting around roller 80. Further, the driving forces and momentum placed upon dough sheet 12 by conveyor 20 and system 38 acting with the gravitational forces insures that dough sheet 12 extends around roller 80, around pushing element 82, and through aligning element 96 even at fast speeds of operation.

It can be further appreciated that due to the adjustability of the angular relationship between legs 84 and 86 of pushing element 82, the lateral spacing between rollers 98 and 100 of aligning element 96, and the three dimensional positioning of elements 82 and 96, the free edges of folded sheet 14 can be precisely aligned. Further, due to the momentum and driving and gravitational forces placed upon dough sheet 12, the free edges of folded sheet 14 will remain precisely aligned and specifically will tend not to travel relative to each other during operation, even at fast speeds of operation. However, even if such travel does occur, realignment of the dough sheet's free edges can be easily made by suitable adjustment primarily of wishbone pushing element 82. Further, apparatus 16 can include a sensing eye which provides a signal to the controller for an alarm and/or product reject in the event of misalignment of the dough sheet's free edges.

The present apparatus thus is particularly useful in connection with the continuous, high production capacity manufacture of two-ply laminated snack half products.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. An apparatus for flipping and aligning a single continuous flexible sheet into a folded continuous two-ply sheet, with the single continuous sheet having first and second free edges and first and second faces, comprising in combination: means for directing the single continuous sheet generally vertically downward in a flat condition; means for pushing the first face of the single continuous sheet intermediate the first and second free edges and into a generally V-shape including a first wing and a second wing interconnected by an intermediate portion; and means for guiding the first face of the first wing on the first face of the second wing to form the folded continuous sheet, with the first and second free edges being aligned relative to each other in the folded continuous sheet.

2. The apparatus of claim 1 wherein the guiding means comprises, in combination: a first guiding roller; a second guiding roller; and means for mounting the first and second guiding rollers in a spaced relation, with the first guiding roller rolling on the second face of the first wing and the second guiding roller rolling on the second face of the second wing.

3. The apparatus of claim 2 wherein the pushing means comprises a V-shaped wishbone pushing element comprising, in combination: a first leg having a first end and a second end; a second leg having a first end and a second end; and means for connecting the first ends of the legs at an angular relationship.

4. The apparatus of claim 3 wherein the connecting means comprises means for adjustably connecting the first ends of the legs at variable angular relationships.

5. The apparatus of claim 4 wherein the connecting means comprises an adjustable joint.

6. The apparatus of claim 4 wherein the mounting means comprises means for adjustably mounting the first and second guiding rollers in a variable spaced relation.

7. The apparatus of claim 3 wherein the directing means comprises an idler roller, with the single continuous sheet extending over the idler roller.

8. The apparatus of claim 7 wherein the directing means further comprises, in combination: means for driving and tensioning the single continuous sheet for delivery to the idler roller.

9. The apparatus of claim 8 wherein the driving and tensioning means comprises, in combination: a lower drive roller; an intermediate drive roller; and an upper drive roller; and means for driving the lower drive roller, the intermediate drive roller, and the upper drive roller in a synchronized manner, with the single continuous sheet extending around the lower drive roller, around the intermediate drive roller, and around the upper drive roller to the idler roller.

10. The apparatus of claim 9 wherein the vertical height of the upper drive roller is greater than the vertical height of the idler roller such that the single continuous sheet extends from the upper drive roller to the idler roller at a downward angle.

11. The apparatus of claim 10 wherein the directing means further comprises, in combination: a conveyor extending at an upward incline towards the driving and tensioning means, with the single continuous sheet being conveyed on the conveyor to the lower drive roller.

* * * * *